United States Patent
Sechrist

(10) Patent No.: US 6,274,101 B1
(45) Date of Patent: Aug. 14, 2001

(54) APPARATUS FOR IN-SITU REACTION HEATING

(75) Inventor: Paul A. Sechrist, Des Plaines, IL (US)

(73) Assignee: UOP LLC, Des Plaines, IL (US)

(*) Notice: Subject to any disclaimer, the term of this patent is extended or adjusted under 35 U.S.C. 154(b) by 0 days.

(21) Appl. No.: 09/149,866

(22) Filed: Sep. 8, 1998

(51) Int. Cl.⁷ .................................................. F28D 21/00
(52) U.S. Cl. ........................... 422/198; 422/190; 422/236; 423/659
(58) Field of Search .................................. 422/196, 190, 422/198, 236; 423/659

(56) References Cited

U.S. PATENT DOCUMENTS

| | | | |
|---|---|---|---|
| 5,130,106 | 7/1992 | Koves et al. | 422/216 |
| 5,328,359 | 7/1994 | Retallick | 431/326 |
| 5,405,586 | 4/1995 | Koves | 422/218 |
| 5,525,311 | 6/1996 | Girod et al. | 422/200 |
| 5,670,269 | * 9/1997 | Hamada et al. | 429/20 |
| 5,763,114 | * 6/1998 | Khandar et al. | 429/20 |

* cited by examiner

*Primary Examiner*—Marian C. Knode
*Assistant Examiner*—Frederick Varcoe
(74) *Attorney, Agent, or Firm*—John G. Tolomei; James C. Paschall

(57) ABSTRACT

A process and apparatus for indirectly heating reactants in a reaction zone controls the combustion of fuel through the metering of combustion gas from a central channel across perforated plates into outer combustion channels. Controlling the combustion of fuel in channels that supplies heat indirectly to a reaction zone simplifies the operation of the reaction zone and improves reaction zone conversion and/or selectivity. Simplified operation results from the elimination of equipment for the heating of the heat exchange fluid by the controlled combustion of fuel in situ in the reaction zone. Improved conversion and/or selectivity proceeds from reduction in temperature differences between the heating medium and the reactants. Catalyst promotion of fuel combustion may also be varied through other available mechanisms such as variations in residence time, catalyst composition, flow area, and component concentration. Particularly suitable catalysts comprise oxidation promoting catalysts.

7 Claims, 4 Drawing Sheets

APPARATUS FOR IN-SITU REACTION HEATING

FIELD OF THE INVENTION

This invention relates generally to exchangers for indirect heat exchange and the heating of reactants to control temperature conditions in a reaction process.

BACKGROUND OF THE INVENTION

In many industries, like the petrochemical and chemical industries, contact of reaction fluids with a catalyst in a reactor under suitable temperature and pressure conditions effects a reaction between the components of one or more reactants in the fluids. Most of these reactions generate or absorb heat to various extents and are, therefore, exothermic or endothermic. The heating or chilling effects associated with exothermic or endothermic reactions can positively or negatively affect the operation of the reaction zone. The negative effects can include among other things: poor product production, deactivation of the catalyst, production of unwanted by-products and, in extreme cases, damage to the reaction vessel and associated piping. More typically, the undesired effects associated with temperature changes will reduce the selectivity or yield of products from the reaction zone.

Many arrangements seek to overcome the negative effects of heating or chilling by supplying heat to the reaction. More traditional methods employ multiple stages of heating or cooling between adiabiatic reaction stages. Other methods use in situ heating via simultaneous reactions or indirect heat exchange to maintain an isothermal or other temperature with the reaction zone. U.S. Pat. No. 5,525,311 provides an example of indirect heat exchange with a heat exchange fluid to control the temperature profile within a reaction zone.

A variety of processes can employ indirect heat exchange with a reaction zone to control temperature profiles within the reaction zone. Common examples are of hydrocarbon conversion reactions include: the aromatization of hydrocarbons, the reforming of hydrocarbons, the dehydrogenation of hydrocarbons, and the alkylation of hydrocarbons.

Briefly, in catalytic reforming, a feedstock is admixed with a recycle stream comprising hydrogen and contacted with catalyst in a reaction zone. The usual feedstock for catalytic reforming is a petroleum fraction known as naphtha. Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. Further information on reforming processes may be found in, for example, U.S. Pat. No. 4,119,526 (Peters et al.); U.S. Pat. No. 4,409,095 (Peters); and U.S. Pat. No. 4,440,626 (Winter et al), the contents of which are herein incorporated by reference.

Catalytic dehydrogenation is another example of an endothermic process. In catalytic dehydrogenation, a feedstock is admixed with a recycle stream comprising hydrogen and contacted with catalyst in a reaction zone. Feedstocks for catalytic dehydrogenation are typically petroleum fractions comprising aromatic of paraffinic hydrocarbons. The dehydrogenation of ethyl benzene to produce styrene is well known. Paraffinic feedstock ordinarily have from about 3 to about 18 carbon atoms. Particular feedstocks will usually contain light or heavy paraffins. A catalytic dehydrogenation reaction is normally effected in the presence of catalyst particles comprised of one or more Group VIII noble metals (e.g., platinum, iridium, rhodium, palladium) combined with a porous carrier, such as a refractory inorganic oxide. Alumina is a commonly used carrier. Dehydrogenation conditions include a temperature of from about 400° to about 900° C., a pressure of from about 0.01 to 10 atmospheres and a liquid hourly space velocity (LHSV) of from about 0.1 to 100 $hr^{-1}$. Generally, for normal paraffins, the lower the molecular weight the higher the temperature required for comparable conversions. The pressure in the dehydrogenation zone is maintained as low as practicable, consistent with equipment limitations, to maximize the chemical equilibrium advantages. The preferred dehydrogenation conditions of the process of this invention include a temperature of from about 400–700° C., a pressure from about 0.1 to 5 atmospheres, and a liquid hourly space velocity of from about 0.1 to 100 $hr^{-1}$.

The effluent stream from the dehydrogenation zone generally will contain unconverted dehydrogenatable hydrocarbons, hydrogen and the products of dehydrogenation reactions. This effluent stream is typically cooled and passed to a hydrogen separation zone to separate a hydrogen-rich vapor phase from a hydrocarbon-rich liquid phase. Generally, the hydrocarbonrich liquid phase is further separated by means of either a suitable selective adsorbent, a selective solvent, a selective reaction or reactions or by means of a suitable fractionation scheme. Unconverted dehydrogenatable hydrocarbons are recovered and may be recycled to the dehydrogenation zone. Products of the dehydrogenation reactions are recovered as final products or as intermediate products in the preparation of other compounds. Additional information related to the operation of dehydrogenation catalysts, operating conditions, and process arrangements can be found in U.S. Pat. Nos. 4,677,237; 4,880,764 and 5,087,792, the contents of which are hereby incorporated by reference.

Another process example are processes for the production of hydrogen and carbon oxides by reforming methane in the presence of steam or carbon oxides have been practiced for many years. The steam reforming process is particularly well known and involves passage of a mixture of feedstock and steam over a steam reforming catalyst. Typical steam reforming catalyst comprises nickel and may include cobalt on refractory supports such as alpha alumina or calcium aluminate. The strong endothermic nature of the primary steam reforming reaction requires a supply of heat to maintain the reaction. Those skilled in the art routinely balance the endothermic heat requirements of the primary reforming with a partial oxidation of hydrocarbons to provide a secondary reforming reaction that supplies heat for the primary reforming stage and generates additional synthesis gas. Extensive and highly developed teachings detail methods of indirectly exchanging heat between primary and secondary reforming. The operation of an adiabatic reformer for synthesis gas production is shown in U.S. Pat. No. 4,985,231. U.S. Pat. No. 5,300,275 sets forth another basic arrangement that uses a secondary reforming reaction to supply hot gas for heating the primary reforming reaction. Patents U.S. Pat.

Nos. 4,810,472; 4,750,986; and 4,822,521 disclose particular arrangements of heat exchange reactors that indirectly exchange heat between hot gases from the secondary reforming stage and the primary reforming stage. U.S. Pat. No. 4,127,389 shows a variety of tube chamber designs for supplying heat to a primary reforming reaction from a secondary reforming reaction zone. As established by the above referenced patents, the art currently relies exclusively on tube arrangements, and most commonly relies on double walled tubes referred to as "bayonet tubes, for exchanging heat between the primary and secondary reforming zones. The geometry of tubular reactors poses layout constraints that require large reactors and vast tube surface to achieve high heat transfer efficiencies.

Other process applications accomplish indirect heat exchange with thin plates that define channels. The channels alternately retain catalyst and reactants in one set of channels and a heat transfer fluid in adjacent channels for indirectly heating or cooling the reactants and catalysts. Heat exchange plates in these indirect heat exchange reactors can be flat or curved and may have surface variations such as corrugations to increase heat transfer between the heat transfer fluids and the reactants and catalysts. Many hydrocarbon conversion processes will operate more advantageously by maintaining a temperature profile that differs from that created by the heat of reaction. In many reactions, the most beneficial temperature profile will be obtained by maintaining substantially isothermal conditions. In some cases, a temperature profile directionally opposite to the temperature changes associated with the heat of reaction will provide the most beneficial conditions. For such reasons it is generally known to contact reactants with a heat exchange medium in cross flow, cocurrent flow, or countercurrent flow arrangements. A specific arrangement for heat transfer and reactant channels that offers more complete temperature control can again be found in U.S. Pat. No. 5,525,311; the contents of which are hereby incorporated by reference. Other useful plate arrangements for indirect heat transfer are disclosed in U.S. Pat. Nos. 5,130,106 and 5,405,586.

Supplying the heat for indirect heat exchange can be done directly by the combustion of a fuel. The use of catalysts to control the direct combustion of a fuel for heating purposes is well known. U.S. Pat. No. 5,328,359 shows an arrangement of coated plates for the combustion of fuel in a multistage combustor. The '359 patent deals with the problem of overcoming localized hot spots on the plates that can deactivate the catalyst.

It is an object of this invention to improve the efficiency of heating reactants in a process that uses direct fuel combustion.

It is a further object of this invention to more closely match the heating requirements of the reaction with the combustion of the fuel.

Another object of this invention is to control the introduction of combustion reactants into a system for in-situ heating of reactants in a reaction zone by combustion of fuel in a heating zone that communicates thermally with the reaction zone.

BRIEF SUMMARY OF THE INVENTION

It has now been discovered that modifications to the method and apparatus for indirectly heating reactants in the reaction zone can improve conversion and/or yields and simplify equipment. The invention works with catalytically promoted combustion of the fuel and controls the catalytic combustion rate in the channels that generate the heat for indirect exchange with the reaction zone. The combustion zone has an arrangement of inner gas distribution channels and outer combustion channels that contain a combustion catalyst. The combustion reactants are referred to as the combustion reactant, usually an oxygen containing gas, and the fuel stream. One combustion reactant flows through the inner heating channels and the other combustion reactant flows through the outer heating channels. Metering perforations in the plates that separate the inner heating channel from the outer heating channel distribute combustion gas to the channel containing the fuel stream.

In particular this invention provides a highly efficient utilization of the plate and channel reaction and heating configuration. Controlling the combustion of a fuel in channels that indirectly heat a reaction zone by indirect heat exchange across a heat exchange surface can moderate temperatures thereby improving conversion, selectivity or both. Temperature moderation by varying the combustion rate of the fuel can also reduce catalyst deactivation in the reaction zone. Direct combustion at variable catalytic rates can also eliminate separate equipment for preheating the feed such as charge heaters or additional exchangers. Overall the invention can also conserves heat by eliminating the need for a separate heater in the process and removing the heat losses associated therewith.

The invention has application to any configuration of heat exchanging reaction zone, but finds its most beneficial use in an arrangement that employs a plurality of plates to define narrow channels. The plates ordinarily define alternate channels with one group of channels for heating and converting reactants and another group of interleaved channels for catalytically combusting a fuel. The arrangement can also extend the reaction channels to include an upstream section that indirectly preheats the feed against the combusted fuel. Typically the upstream preheat section of the reaction channels contains no catalyst and the downstream portion of the reaction channels may contain a particulate catalyst or a catalytic coating on the walls of the channels.

The fuel for heating the reaction section may be any transportable material that can enter the heating channels at suitable conditions to provide controlled catalyst combustion and readily exit the channels after at least partial combustion of the fuel. Gas phase fuel streams are preferred. Light gas streams comprising hydrogen and/or hydrocarbons are particularly preferred. Methane provides a particularly useful heating fluid. In some cases the fuel fluid can comprise the feed or the reactant components from the reaction channels. In most cases the addition of oxygen or air to the fuel stream will combust the fuel by oxidation. A wide variety of combustion promoting catalysts and more particularly oxidation catalysts are known to those skilled in the art for incorporation into the heating channels. The invention can send fuel to outer or inner subchannels in the heating channels. The fuel channels will typically retain a catalyst. The catalyst may reside in the channels as particles or a coating on the walls of the channels. Particles are usually preferred since they do not interfere with the metering openings on the walls of the channels.

The channels for containing the fuel metering, combustion and reaction functions constitute an essential requirement of this invention. The heating and reaction channels may take on a many different configurations that suit the particular process and fuel combustion. A number of different methods may be used in combination with the fuel metering to vary the rate at which the combustion catalyst promotes combustion of the fuel in the heating channels. The operation may vary process conditions such as residence time/space velocity. The concentration of fuel reactants may also vary by the introduction of additional fuel or diluents. Another variation method may increase the amount of catalyst present in the heating channels. Increasing or decreasing the loading of catalytically active material on a catalyst base over the length of the heating channels will vary the combustion rate. In addition to changing the catalyst through a change in metals loading the type of catalyst may also vary over the length of the heating channels. Furthermore, the method of this invention may simply change the amount of a uniform catalyst by varying the volume of catalyst per unit of flow length along the channels. From a mechanical standpoint the inherent increasing or decreasing sector width of a radial flow reactor can provide a ready means of varying the volume of catalyst per unit flow length along the heating channels. U.S. Pat. No. 5,405,586 shows a radial flow reactor arrangement with indirect heat exchange that may be modified in accordance with this invention to include variation in combustion of a fuel.

Where provided, a preheat portion of the reaction channel may comprise a portion along a continuous length of the channels or a separate run of channel that preheats the reactants before contacting any catalyst. In vertically extending channels, short loading of catalyst in the reaction channels can provide a space above or below the primary reforming section in which to preheat feed.

The heating channels and reaction channels may pass fluids in cross, cocurrent or countercurrent flow. Countercurrent flow will provide the greatest heat input into the reaction portion of the reaction channels. Cocurrent flow will maximize heating in the preheat portion of the reaction channels. A higher catalyst loading in the preheating section of the reaction channels can provide a rapid heating of the entering reactants.

Mechanical elements for this invention will typically comprise tubes or plates. A series of concentric tubes can provide an inner combustion channel and an outer fuel channel disposed in a bed of reaction catalyst. Preferably the mechanical elements will comprise flat thin plate elements that define the necessary channels.

Distribution chambers along the channel paths may provide sites for intermediate injection of reactants or heating medium. Distribution chambers may be provided at the ends of channels or along the mid points as desired. One arrangement of such manifolds uses two or more separate stacks of heat exchange plates or "reaction stacks" to conduct different reactions and heat exchange steps in isolated banks. For example, one arrangement of alternating narrow channels in a reaction stack may contain catalyst for the heating channels only while a downstream reaction stack contains catalyst in both the reaction and heating channels. A system of manifolds passes the isolated preheated feed and heating fluid effluent to another section of heating channels and reaction channels that again indirectly contact the heating fluid with the reactants. Integration of the manifolds with external pipes can further enhance process control and the addition or withdrawal of heating fluid or reactants.

Suitable plate arrangement may use relatively smooth plates with intermediate spacers placed intermittently between the plates to preserve the channel space and to introduce turbulence for promoting heat transfer. A spiral wound arrangement of narrowly spaced apart channels can provide a high degree of contacting and heat exchange. A preferred form of the heat exchange elements is relatively flat plates having corrugations defined therein. The corrugations serve to maintain spacing between the plates while also supporting the plates to provide a well supported system of narrow channels. Additional details on the arrangement of such plates systems are shown in U.S. Pat. No. 5,525,311; the contents of which are hereby incorporated by reference.

Plate arrangements will preferably incorporate perforated plates. Most advantageously perforated plates would allow the controlled quantities of the reactants to flow directly from the inner heating channel to the outer heating channels that contain the additional combustion reactant and optionally a combustion catalyst. Perforated plates would disperse the introduction of the reactants over a desired portion of the outer heating channels. U.S. Ser. No. 08.999,877 filed Nov. 11, 1997 shows an arrangement of perforated plates that meters reactants across channels defined by the plates. Those skilled in the art will recognize other variations in plate configurations that can provide additional benefits to the integration of the heating and reaction channels.

Plate arrangements may also vary the catalyst loading in the heating channels. Plates can occupy a portion of the channels to reduce catalyst loading in only a portion of the heating channels. A thick plate may extend through a portion of the heating channels and solidly displace catalyst from a portion of the heat exchange channel. Pairs of solid plates may extend over a portion of the heat exchange channels to define sub-channel void volumes.

Accordingly in a process embodiment this invention is a process for contacting reactants with a catalyst in a reaction zone and indirectly heating the reactants by catalytic combustion of a fuel. The process passes a reactant stream through a plurality of reaction channels and heats the reactant stream under conditions to chemically react the reaction stream. A heating fuel stream passes through a plurality of first heating channels and a combustion gas passes through a plurality of second heating channels. A plurality of perforated partitions separate the first heating channels from the second channels and meter the combustion gas from the second plurality of heating channels to the first plurality of heating channels to control the distribution of the combustion gas into contact with the heating fuel. Combusting the heating fuel in the first heating channels indirectly heats the reactant stream in the reaction channels. A reacted stream is recovered from at least one of the reaction channels or the first heating channels.

In an apparatus embodiment this invention is a reactor apparatus for the combustion of a fuel to indirectly heat reactants. The apparatus comprises a first plurality of spaced apart plates defining a plurality of reaction channels and partially defining a plurality of heating channel groups between each reaction channel. At least one intermediate plate divides each heating channel group into a fuel subchannel and a metering subchannel. Each intermediate plate retains a metering device for metering a combustion gas from the metering subchannel into the fuel subchannels. A plurality of reaction inlets and a plurality of reaction outlets each respectively communicate with the opposite ends of the plurality of reaction channels. A plurality of combustion gas inlets communicate with the metering subchannels. A plurality of fuel inlets and combustion gas outlets each respectively communicate with the opposite ends of the fuel subchannels.

Additional embodiments, arrangements, and details of this invention are disclosed in the following detailed description of the invention.

DETAILED DESCRIPTION OF THE INVENTION

Figure 1:
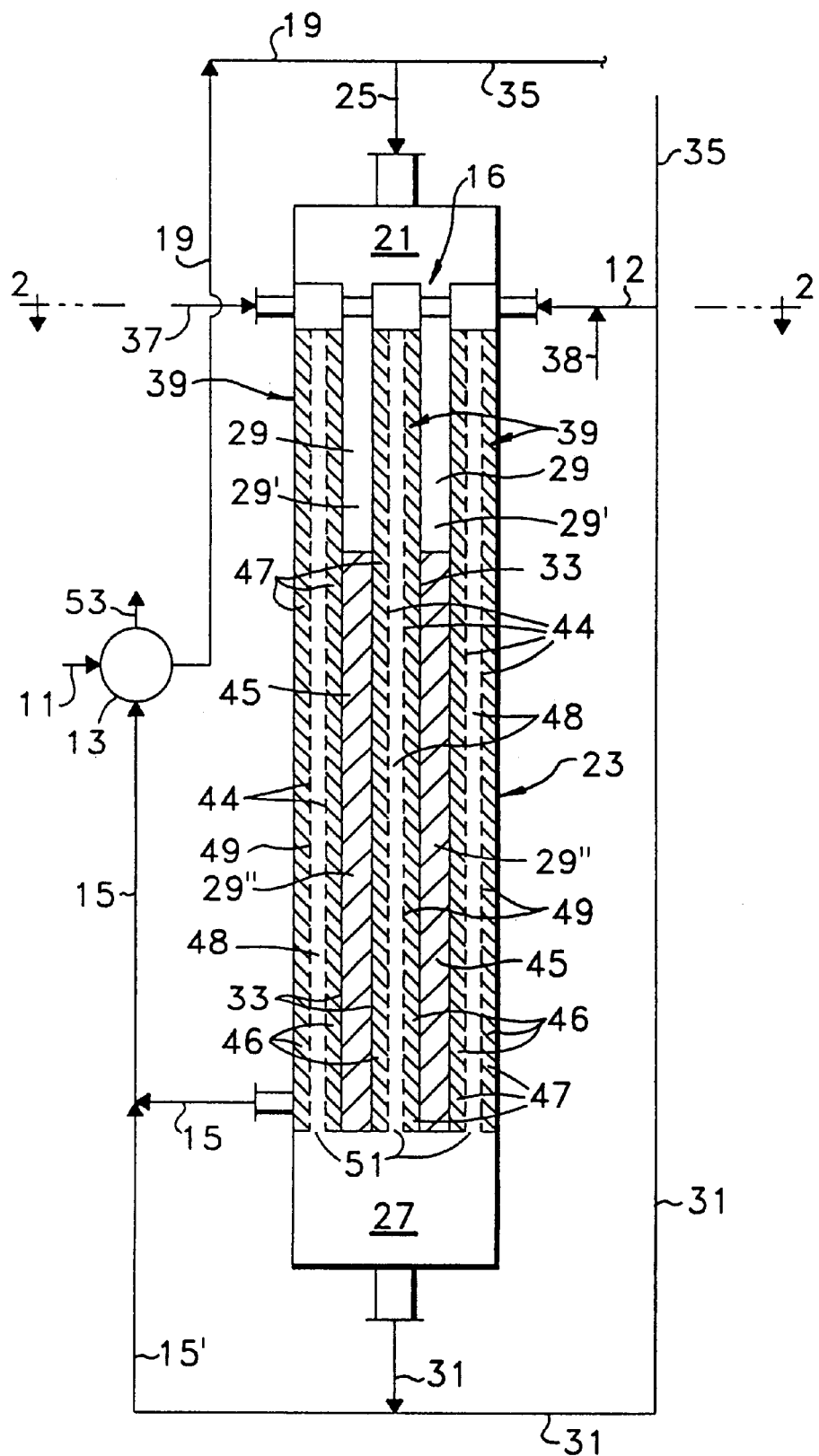
FIG. 1 is a schematic diagram of vertical plate channel exchanger incorporating an arrangement of this invention.

The invention may apply to any type of heat exchanger reaction arrangement. Suitable reactor arrangement include shell and tube and plate type exchanger arrangements using concentric tubes to define metering and fuel subchannels of the heating channel groups. For most exchanger arrangements the pressure drop between the heating and reaction channels will not exceed 700 kPa. Restriction of pressure drop most significantly affects plate exchanger arrangements that use relatively thin plates to maximize heat transfer.

In accordance with one of its primary benefits this process maintains a relatively low ΔT between the exothermic heating zone and the endothermic reaction zone. In general the temperature variation between the heating channels and the reaction channels will not exceed 100° C. More typically, temperature difference between the heating channels and the reaction channels will not exceed 50° C. and will may in many cases not exceed 25° C. Uniformity of temperature is primarily controlled in this invention by varying the distribution of the combustion gas into the fuel channels and varying the catalytic combustion over the length of the heating channels.

This invention may be useful for any endothermic process that catalytically combusts a fuel within heat exchange channels to maintain the temperature of the reactant stream. The invention is particularly beneficial in the preheating of the reactant stream to the desired reaction temperature within the heat exchange zone. This invention may be especially useful in auto thermic processes where the conversion of a reactant or a portion of an endothermically reacted stream provides fuel for an exothermic reaction that heats the endothermic reaction.

Many reactions for the production of hydrocarbon and chemical products meet these requirements. A suitable endothermic process is the dehydrogenation of hydrocarbons. Examples of applicable auto thermic process include the dehydrogenation of hydrocarbons, production of raw ammonia synthesis gas, production of raw hydrogen streams, and the production of synthesis gas for conversion to organic compounds.

Looking at synthesis gas its production ordinarily includes a primary reforming step of reforming a hydrocarbon feedstock with steam to give a gas containing carbon oxides, hydrogen, methane, and unreacted steam. In the production of synthesis gas, a fluid hydrocarbon such as natural gas is converted to a hot reformed gas mixture containing principally hydrogen and carbon monoxide in this process according to reaction (1) as follows:

$$CH_4 + H_2O \leftrightarrow CO + 3H_2 \qquad (1)$$

that is generally known as primary reforming and is widely used in the production of synthesis gas or pure hydrogen. This endothermic reaction is carried out in the practice of this invention by passing a gaseous mixture of fluid hydrocarbon and steam through a preheat section of a reaction channel that is free of catalyst and a catalytic section of reaction channel. A suitable catalyst composition such as solid catalyst granules deposited on an inert carrier material fills the catalytic section of the reaction channels.

The necessary heat is supplied to the reaction channels by a secondary reforming reaction that oxidizes a fluid hydrocarbon fuel such as a side stream from the fluid hydrocarbon feedstream or a portion of the primary reforming effluent stream. Oxidation supplies the heat to the primary reformer by indirect heat exchange across heat exchange plates.

The following reactions occur in the heating channels that contain the secondary reforming zone:

$$2CO + O_2 \rightarrow 2CO_2, \qquad (2)$$

$$2CH_4 + O_2 \rightarrow 4H_2 + 2CO, \qquad (3)$$

and

$$2H_2 + O_2 \rightarrow 2H_2O \qquad (4)$$

Reactions (2), (3), and (4) are exothermic reactions that tend to occur quite rapidly in the secondary reaction space. As the resulting gas mixture passes through the catalyst bed of the secondary reformer zone, the remaining methane is converted by reaction with steam in accordance with reaction (1) above and by the reaction with oxygen according to reaction (2) above so that very little methane remains in the product gas of the process. The strongly endothermic reaction (1) is a relatively slow reaction that occurs throughout the passage of the gases through the catalyst bed of the secondary reforming zone, thereby cooling the gases from the high temperatures reached by reactions (2), (3), and (4) that occur toward the feed end of the secondary reaction zone. In the practice of the invention, the proportions of oxygen and of the fluid hydrocarbons feed passed to the integrated primary-secondary reformers maintain an essentially, or completely, autothermal process with essentially no external fuel requirement. A advantageous feature of the invention is the flexibility of being able to bypass a portion of the hydrocarbon feedstream directly to the secondary reforming reaction space at the feed end of the secondary reforming zone.

Typical operating temperatures for the production of a raw synthesis gas are in range of from 420—950° C. The specific operating pressures employed are principally influenced by the pressure requirements of the subsequent processing operations in which the reformed gas mixture is employed. Any super atmospheric pressure can be used in the practice of most reforming operations and is suitable for most applications of the apparatus and process of this invention. Operating pressures within the process usually lie within a range of from 2 to 10 MPa. In the production of synthesis gas for ammonia production the effluent from the primary reforming step reacts catalytically with an oxygen and nitrogen containing mixture, typically air, to convert additional portions of methane and introduce nitrogen into the product stream. After the shift reaction and $CO_2$ removal, the raw ammonia synthesis gas will have a desirable hydrogen to nitrogen ratio of approximately 2.5 to 3.0.

The reactant stream contacts a catalyst in each of the reaction channels. Catalysts employed in steam reforming are well known. Specific examples of reforming catalysts that can be used are nickel, nickel oxide, cobalt oxide, chromia, molybdenum oxide and rhodium based catalyst on an α-alumina support. The catalyst can be employed with promoters and can also have been subject to various special treatments known in the art for enhancing its properties. Promoted nickel oxide catalysts are generally preferred, and the catalytic section of the primary reformer channels are packed with solid catalyst granules, usually comprising the catalytic agent deposited on a suitable inert carrier material. The secondary reforming zone contains a catalyst material that typically is the same as the primary reforming zone catalyst.

As an alternate to a particulate catalyst, the catalyst may also be coated on the surface of the plates in the various reforming zones. It may be particularly advantageous to coat the primary reforming catalyst onto the plates to provide an upper catalytic section and a lower catalyst-free section that is maintained in heat exchange relationship across the channel defining plates with the catalytic secondary reforming section.

FIG. 1 depicts schematic flow arrangement and conceptual reactor details for a steam reforming process arranged in accordance with this invention. A synthesis gas feed comprising natural gas and steam in a steam to methane proportion of from 1.5 to 4 enters the process via line 11 and undergoes heat exchange in a conventional heat exchanger 13 with a synthesis gas product stream carried by a line 15. The preheated feedstream passes via lines 19 and 25 to a distribution space 21 in a heat exchange reactor 23. Distribution space 21 disperses the heated synthesis gas to a plurality of primary reforming reaction channels 29 that are defined by imperforate plates 33. Short loading of reforming catalyst 45 into channels 29 maintains an optional catalyst free preheating zone in an upper portion 29' and the catalyst for the reforming reaction in lower portions 29". A screen material located at the bottom of channels 29 permits gas flow while holding the catalyst in place. Collection space 27 collects the effluent from the primary reforming zone from the bottom of channels 29.

A line 31 recovers the primary reforming effluent from collection space 27. A line 15' can by-pass a desired portion of the primary reforming zone effluent from line 31 directly to the product of line 15. A line 35 may divert a portion of the primary reforming feed to line 31 for direct input to the secondary reforming reaction zone. A line 38 may also provide additional fuel to the secondary reaction zone as required. A line 12 delivers the remainder of the effluent from line 31 along with any diverted feed or additional fuel to the fuel channels 47 of the groups of heating channels 39 that form the secondary reforming zone. Line 37 provides air or other oxygen containing gas to the metering channels 48 of heating channel 39 for combustion of the fuel in the fuel channels 47.

Figure 2:
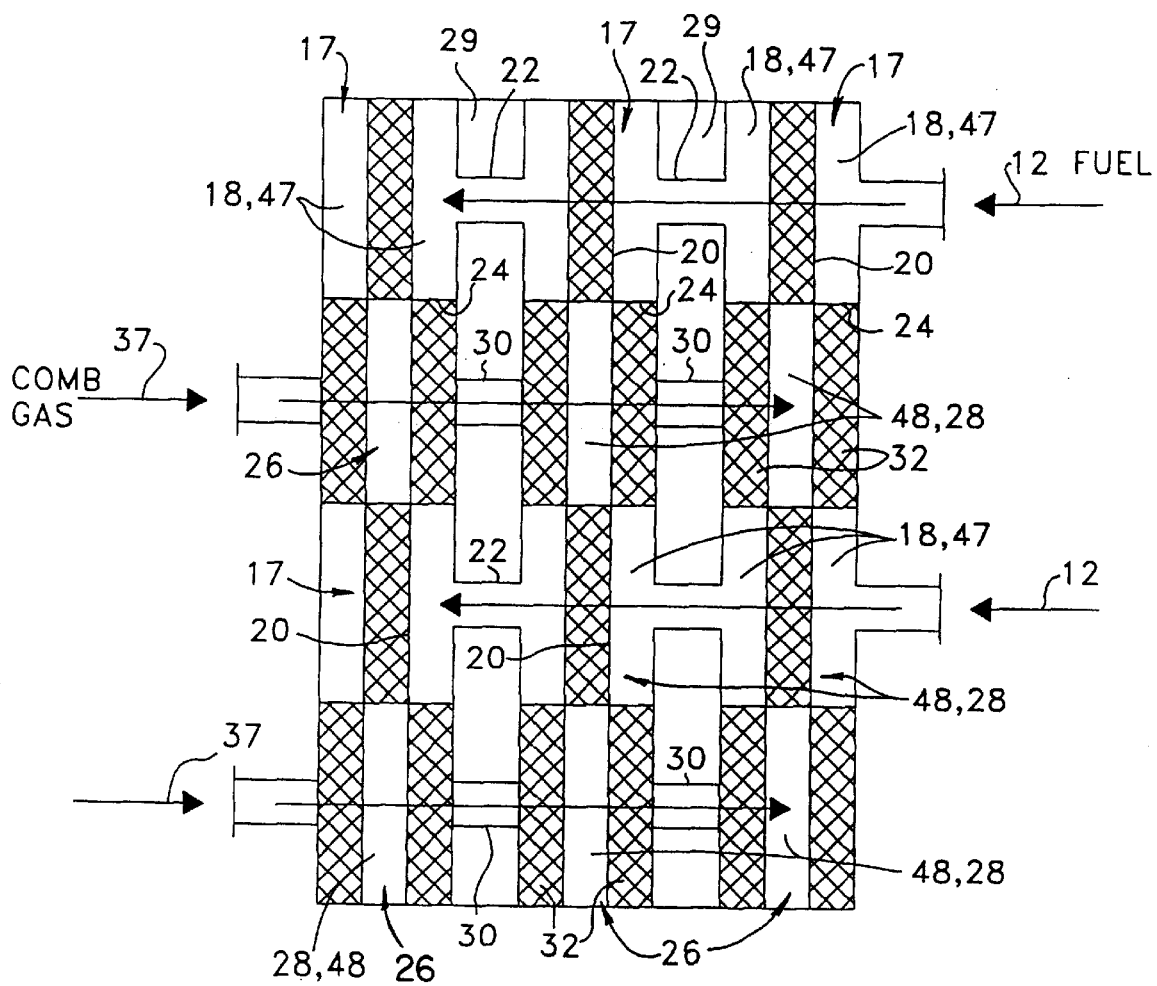
FIG. 2 is a section of FIG. 1 taken at lines 2—2.

A manifold system 16 at the top of the channels distributes the gas streams to the groups of heating channels 39 while permitting free flow of the incoming primary feed from the distribution space 21 to the reaction channels 29. FIG. 2 shows in more detail the manifold arrangement for distributing the entering primary feed to the reaction channels, the entering combustion fuel to the fuel channels, and the entering combustion gas to the metering channels. Incoming fuel from lines 12 flows into a series of fuel distribution chambers 17. Fuel distribution chamber 17 distributes the incoming fuel to the open tops 18 of fuel channels 47. A blank off 20 occludes the top of the metering channels where they register with the fuel distribution chamber 17 to prevent fuel from entering the metering channels. Crossover connectors 22 transfer the entering fuel through the inlet space for reactant channels 29 and across all of the fuel distribution chamber 17. Divider plates 24 separate the fuel distribution chambers 17 from chambers 26 for the distribution of combustion gas to the metering channels 48. Combustion gas entering from lines 37 flows across the open inlets 28 of metering channels 48. Blank offs 32 at the top of the fuel channels 47 again prevent the entry of combustion gas into the fuel channels 47 while crossovers 30 communicate the combustion gas to all of the chambers 26. Crossovers 22 and 30 occupy less than the total area above reaction channels 29 to permit free flow of reactants thereto.

The metering channels 48 combine $O_2$ with the primary reactor effluent or fuel in a manner to avoid the presence of oxygen and other combustibles in general or localized proportions that fall within potential explosive ranges. The metering arrangement eliminates the need for specialized header designs to maintain safe proportions of the mixtures by including packing or other volume displacement material to minimize the volume of oxygen and fuel mixtures.

Perforated plates 44 typically divide each heating channels groups 39 into a pair of fuel channels 47 that bound both sides of a central metering channel 48. The fuel channels 47 preferably contain a combustion catalyst over at least part of their length to promote combustion of the fuel. In the case of steam reforming, contact with a suitable secondary reforming catalyst in the fuel channels 47 directly produces heat for indirect heating of the reactants in the primary reforming zone contained within the reaction channels 29. As the hot gases pass upwardly through heating channels 39, the large surface area provided by the plates 33 that define the reaction and heating channels efficiently transfer heat into the reaction channels 29. The combustion catalyst may extend over only part of the fuel channel length. Different loadings of combustion catalysts may be used in upper and lower part of the fuel channels to facilitate a variation in combustion along the length of the fuel channels. The different loadings may change the quantity or the combustion of the catalyst along the length of the fuel channels. Variation in the perforation pattern along the perforated plates 44 may also facilitate altering the combustion rate in different portion of the fuel channels. Any open volume in the fuel subchannel 47 may be loaded with an inert material in the upper portion of fuel subchannels 47 to equalize pressure drop along fuel subchannels 47.

A manifold arrangement (not shown) collects the secondary reforming zone effluent from the heating channels 48 for withdrawal from the process by lines 15 and 53. Preferably closed ends 51 at the bottoms of metering channels 48 completely close the channel to fluid flow so that all of the combustion gas exits through perforation in the plates. Prior to removal, line 15 passes the secondary reforming effluent through exchanger 13 for heating of the primary reforming feed in the manner previously described. Line 15 may also receive a portion of the primary effluent directly from line 31.

FIG. 1 shows only one possible method of increasing or decreasing the amount of catalyst to vary the catalytic promotion of fuel combustion in a heat exchange type reactor. For example filling the heat exchange channels with an increasing proportion of inert material can effect a desired increase in the combustion activity at the bottom of the channels without the use of the perforated plates. Such a method would apply equally well to the filling of tubes in a tube and shell heat exchanger or to a plate type heat exchanger.

Suitable plates for forming layers of channels in the plate type heat exchange zones of this invention will comprise any plates that allow a high heat transfer rate. Thin plates are preferred and usually have a thickness of from 1 to 2 mm. The plates are typically composed of ferrous or non-ferrous alloys such as stainless steel. Preferred alloys for the plates will withstand extreme temperatures and contain high proportions of nickel and chrome. The plates may be formed into curves or other configurations, but flat plates are generally preferred for stacking purposes. Again each plate may be smooth and additional elements such as spacers of punched tabs may provide fluid turbulence in the channels. Preferably each plate has corrugations that are inclined to the flow of reactants and heat exchange fluid.

Figure 3:
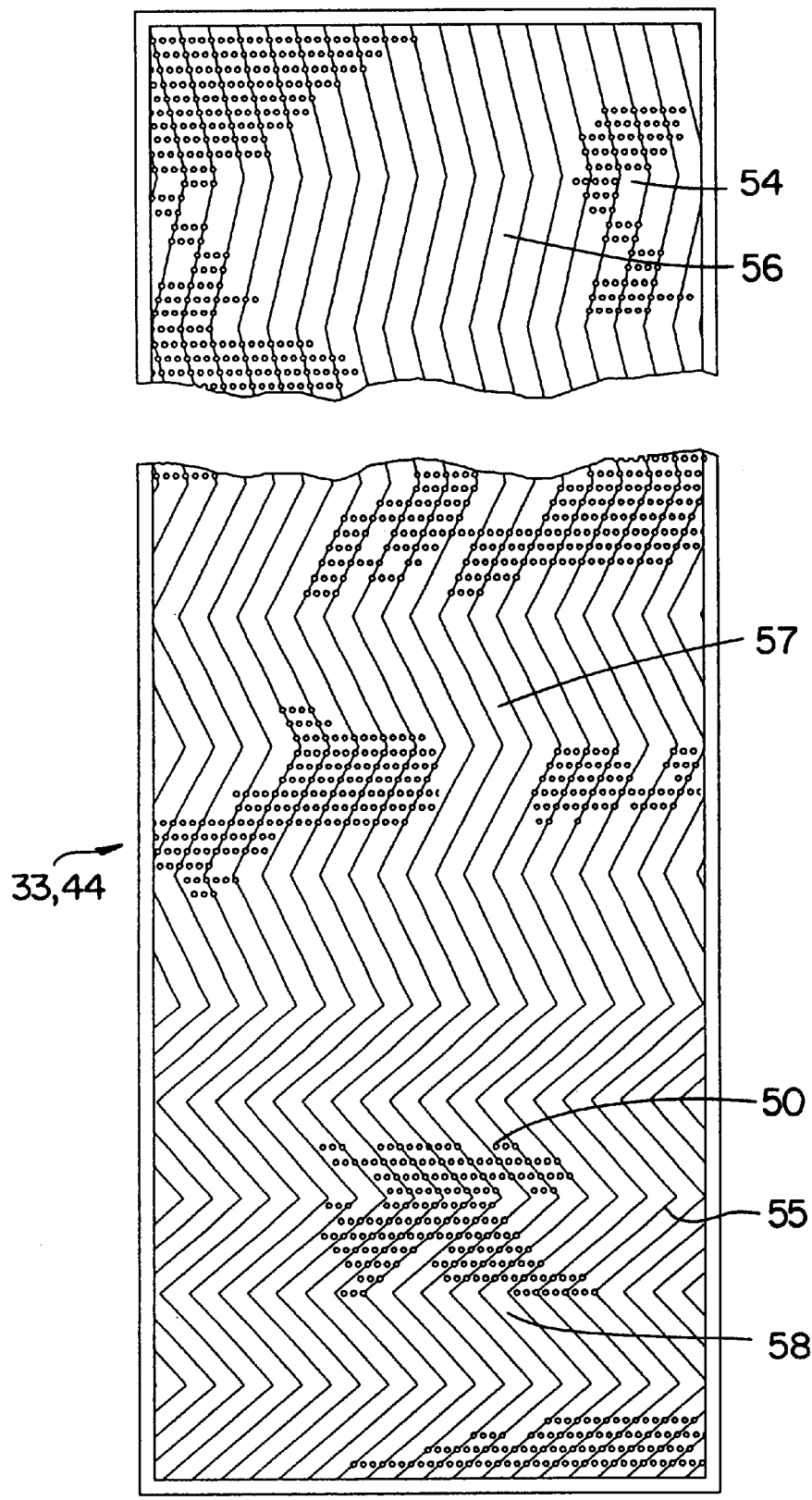
FIG. 3 a schematic drawing of a flat plate element showing a typical corrugation pattern.
Figure 4:
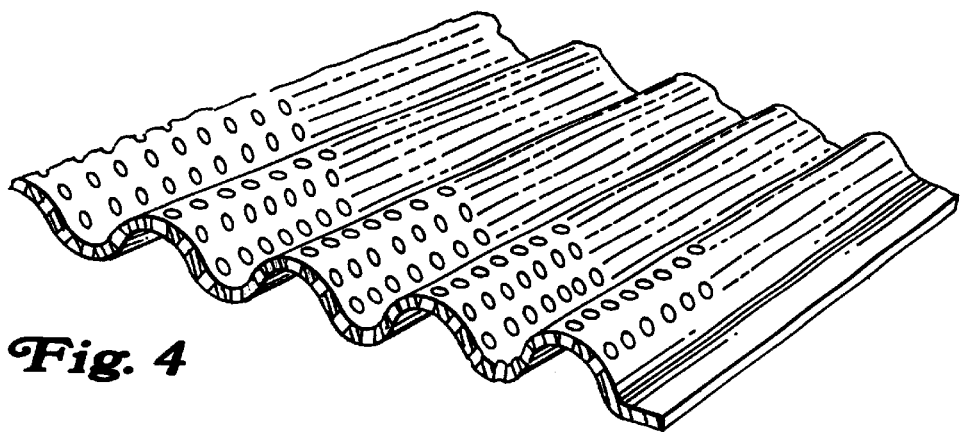
FIG. 4 is an isometric view of single corrugated plates containing perforations.

FIGS. 3 and 4 show the preferred corrugation arrangement for the plates 33 that divide the reaction channels 29 from the heating channels groups 39 and the plates 44 that divide the heating channels groups 39 into metering channels and fuel channels. FIG. 3 shows corrugations defined by ridges 55 and valleys 54. The corrugation pattern can serve at least two functions. One function is to structurally support adjacent plates. The other function is to promote turbulence for enhancing heat exchange efficiency in the narrow reaction channel. The frequency or pitch of the corrugations may be varied as desired to promote any varying degree of turbulence. Therefore, more shallow corrugation angles as shown by the ridges 55 and valleys 54 in plate section 56 will produce less turbulence. Whereas greater corrugation pitches, as shown by the ridges and valleys in plate sections 57 and 58 may provide increased turbulence where desired. The pitch of the corrugations and the frequency may also be varied over a single heat exchange channel to vary the heat transfer factor in different portions of the channel. Preferably, the channels may contain a flat portion 60 about their periphery to facilitate closure of the channels about the sides and tops where desired.

FIG. 3 also shows the holes 50 which would only appear on the perforated plate 44. Smaller holes are preferred with diameters in the range of from 0.5 to 2 mm. The frequency of the holes may be varied as desired to provide the overall combustion gas input and any variation in combustion gas input over the fuel channels.

Figure 5:
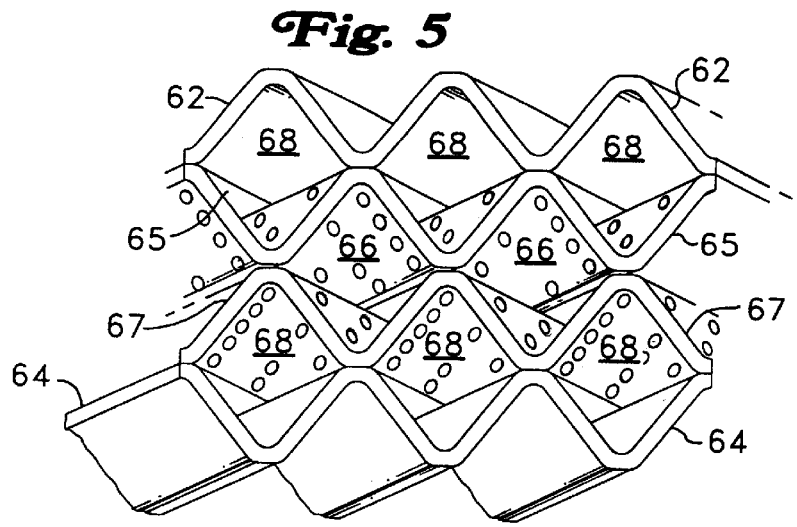
FIG. 5 is an isometric view of corrugated plates forming heating channels.
Figure 6:
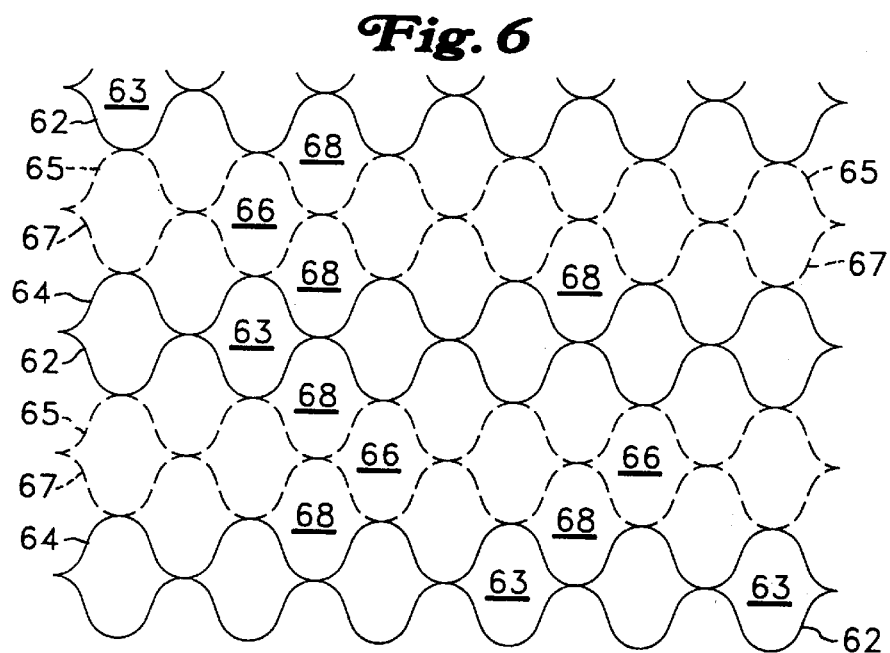
FIG. 6 is a schematic representation of heating and reaction channels formed by corrugated plates.

FIG. 5 shows a typical cross-section of a corrugated plate arrangement for the heating channel groups wherein the corrugations of plates 62 and 67 extend in an opposite direction to the corrugations of plate 65 and 64, and plates 65 and 67 contain perforations. Together the plates define a metering channel 66 and fuel channels 68. FIG. 6 further depicts the cross section of FIG. 5 in an idealized arrangement for the perforated plates and imperforate plates to define the heating channel groups and reaction channels. The space between imperforate plates 62 and 64 define reaction channels 63. The space bordered by perforated plates 65 and 67 define metering channels 66. The spaces between imperforate plate 62 and perforated plate 65 and between imperforate plate 64 and perforated plate 67 define the fuel channels 68.

In general, the invention relies on relatively narrow channels to provide the efficient heat exchange across the plates. The corrugations maintain a varied channel width defined by the height of the corrugations. In general, the channel width should be less than one inch on average with an average width of less than ½ inch preferred. In the case of corrugations, the average channel width is most practically defined as the volume of the channels per the cross-sectional area parallel to the primary plane of the plates. By this definition corrugations with essentially straight sloping side walls will have an average width that equals half of the maximum width across the channels.

Varying the depth of the corrugations over the length of the corrugated plate provides another method of varying the catalyst loading along the length of the heating channels. In such an arrangement the corrugations can change from deep at one end to shallow at the opposite end. Preferably the plate continuously varies the corrugation depth over its length as opposed to using step changes. In either case stacking the plates on top of each other while reversing the location of the deep and shallow corrugations produces heating channels having a narrow channel width at one end and a relatively wide channels width at the opposite end. The stacking interleaves the heating channels with reaction channels having a reversed channel width configuration. The reversed configuration puts the narrow reaction channels opposite the wide heating channels and the narrow heating channels opposite the wide reaction channels. In this manner the heating channels can hold less catalyst at the inlet and more catalyst at the outlet. This type of arrangement also varies the catalytic activity in the reaction channels as well as the heating channels. The average width of the heating channels relative to the reaction channels may be further adjusted by the addition of intermediate plates to provide additional channels width where desired. It may also be advantageous to reduce the width of the corrugation on the perforated plates to define metering channels with a relatively smaller width than the reaction channels and the fuel channels.

What is claimed is:

1. A reactor apparatus for the combustion of a fuel to indirectly heat reactants, the apparatus comprising:

a) a first plurality of spaced apart plates defining a plurality of reaction channels and partially defining a plurality of heating channel groups between pairs of reaction channels;

b) at least one intermediate plate dividing each heating channel group into a fuel subchannel and a metering subchannel;

c) a metering device retained by each intermediate plate for metering a combustion gas from the metering subchannel into the fuel subchannel;

d) a manifold comprising a fuel distribution chamber and a combustion gas distribution chamber, said fuel distribution chamber being separated from said combustion gas distribution chamber, said reaction channels extending from outside said manifold and through said manifold and being separated from said fuel distribution chamber and said combustion gas distribution chamber;

e) a plurality of reaction inlets and a plurality of reaction outlets each in respective communication with the opposite ends of the plurality of reaction channels;

f) a plurality of combustion gas inlets in communication with the metering subchannels; and g) a plurality of fuel inlets and combustion gas outlets each in respective communication with the opposite ends of the fuel subchannels.

2. The apparatus of claim 1 wherein a pair of intermediate plates divides each heating channel group into a single metering subchannel bordered on each side by a fuel subchannel and perforations in the intermediate plates provide the metering device.

3. The apparatus of claim 2 wherein the sizes of some of the perforations in the perforated plates are different.

4. The apparatus of claim 1 wherein the reaction channels and the metering and fuel subchannels have an average width of less than 1 inch.

5. The apparatus of claim 1 wherein the plates are planar.

6. The apparatus of claim 5 wherein the plates define corrugation and the corrugations maintain the spacing of the plates.

7. The apparatus of claim 1 wherein the fuel subchannels include means for retaining a combustion catalyst therein.

* * * * *